(12) United States Patent
Kumar

(10) Patent No.: US 9,514,024 B2
(45) Date of Patent: Dec. 6, 2016

(54) AGENTLESS DATA COLLECTION

(75) Inventor: Arun N. Kumar, Karnataka (IN)

(73) Assignee: Oracle International Corporation, Redwood Shores, CA (US)

( * ) Notice: Subject to any disclaimer, the term of this patent is extended or adjusted under 35 U.S.C. 154(b) by 702 days.

(21) Appl. No.: 12/893,167

(22) Filed: Sep. 29, 2010

(65) Prior Publication Data

US 2011/0078108 A1 Mar. 31, 2011

Related U.S. Application Data

(60) Provisional application No. 61/246,803, filed on Sep. 29, 2009.

(51) Int. Cl.
*G06F 17/30* (2006.01)
*G06F 11/34* (2006.01)
*H04L 29/06* (2006.01)

(52) U.S. Cl.
CPC ..... *G06F 11/3495* (2013.01); *G06F 17/30545* (2013.01); *G06F 11/3409* (2013.01); *G06F 2201/80* (2013.01); *H04L 63/102* (2013.01)

(58) Field of Classification Search
CPC .............................................. G06F 17/30545
USPC ........................................................ 707/602
See application file for complete search history.

(56) References Cited

U.S. PATENT DOCUMENTS

| | | | |
|---|---|---|---|
| 6,505,245 B1 | 1/2003 | North et al. | |
| 2003/0145074 A1* | 7/2003 | Penick | 709/223 |
| 2005/0097199 A1 | 5/2005 | Woodard et al. | |
| 2005/0108688 A1* | 5/2005 | Lucovsky et al. | 717/127 |
| 2005/0210096 A1 | 9/2005 | Bishop et al. | |
| 2006/0004830 A1* | 1/2006 | Lora et al. | 707/102 |
| 2006/0072583 A1* | 4/2006 | Sanda | G06F 21/316 370/395.53 |
| 2006/0161462 A1 | 7/2006 | Sharma | |
| 2006/0248599 A1* | 11/2006 | Sack et al. | 726/27 |
| 2008/0011569 A1 | 1/2008 | Hillier et al. | |

(Continued)

FOREIGN PATENT DOCUMENTS

WO    WO 2007008910 A2    1/2007

OTHER PUBLICATIONS

"AppPerfect, Agentless Monitor 10.5.0 Aministrator Guide", http://www.appperfect.com/support/print-manuals/server-monitor-admin-guide.pdf, Copyright 2002, 66 pages.

(Continued)

*Primary Examiner* — Kris Mackes
(74) *Attorney, Agent, or Firm* — Osha Liang LLP

(57) ABSTRACT

Tools and techniques for collecting data from target systems without the need for installation of expensive and high-maintenance software agents on the target systems. In some cases, these tools can be used to collect performance data from collection targets while still allowing the operator(s) of the collection targets to govern the access of the tools, alleviating security concerns. Merely by way of example, certain tools employ data collection scripts, which may be analyzed by the collection target against security policies of that collection target, to ensure that the scripts will not take any actions that might violate such security policies. Other tools may be used to collect data in real time by transmitting a script for immediate execution by the host system, which could then return the data produced by the script immediately upon completion (and/or as part of execution of the script).

18 Claims, 11 Drawing Sheets

(56) References Cited

U.S. PATENT DOCUMENTS

2008/0162308 A1 7/2008 Sharma
2010/0242106 A1* 9/2010 Harris et al. .................... 726/15

OTHER PUBLICATIONS

BMC Software "Agentless or Agent-based Monitoring—Choose a Hybrid Approach Using BMC Performance Manager" Copyright 2006, 10 pages.
BNET, "Network Intelligence Announces Agent-Less Support for Microsoft Exchange Server 2003, Microsoft SQL Server 7, and Microsoft SQL Server 2000" http://findarticles.com/p/articles/mi_m0EIN/is_2005_June_16/ai_n13817353/, Jun. 16, 2005, 3 pages.
Bocada Inc., "The 5 Essential Advantages: Agentless Technology for Data Protection Management", http://www.bocada.com/download/AgentlessTechnicalBrief.pdf, Mar. 2005, 6 pages.
EG, "The eG Agentless Monitoring Solution", http://www.eginnovations.com/web/egagentless.htm, 3 pages, 2011.
Sensage Inc.,"Agentless Event Collection in Microsoft Windows Environments for Security, Compliance and Systems Management" http://www.sensage.com/collaterals/documents/SenSage_SolutionSheet_AgentlessWindows.pdf, Copyright 2009, 2 pages.

* cited by examiner

AGENTLESS DATA COLLECTION

CROSS-REFERENCE TO RELATED APPLICATIONS

This application is related to and claims the benefit of U.S. Provisional Patent Application No. 61/246,803 filed Sep. 29, 2009 by Kumar and entitled "Agentless Data Collection" of which the entire disclosure is incorporated herein by reference for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to tools and techniques for collecting data from data servers and more particularly, to tools and techniques that collect such data without requiring the installation of any data collection agents on the data servers.

BACKGROUND

In many different fields, there is a need to collect data from a variety of different types of servers. As one example, it has long been known that the collection and analysis of performance data for servers, such as web servers, application servers, file servers, database servers, and the like, can inform an administrator's knowledge about the performance of those servers and can suggest ways in which the servers can be tuned to enhance the performance of those servers. Such performance data, which typically does not include customer or transactional data, can include, without limitation, monitoring data, server logs, specific performance data types (processor utilization, file system data, number of requests serviced over a certain period of time, amount of swap file used, number of disk accesses over a certain period of time, etc.), parameters and information about hardware and/or software configuration, and/or the like.

One common way to acquire performance data from a server is for an administrator to log on to that server and review the server's performance data directly. This typically is a time-intensive and labor-intensive process, however, and many techniques have been proposed to alleviate the burden of such manual administration. A common problem with such techniques is that there may be a variety of different types of servers in a typical system environment, so a "one size fits all" solution is hard to come by.

Some have attempted to address this problem through the use of customized software agents, which can be installed on servers from which data is to be collected. The agents then can collect performance data on each server and either store it locally for later collection or, on their own initiative, transmit the data back to a central server, using a "push" model of data collection. Examples of such techniques include simple network management protocol ("SNMP"), the Oracle Configuration Manager ("OCM") product available from Oracle Corporation, and the like. Agent-based solutions, however, can become expensive and difficult to manage, in part because a specific agent typically needs to be designed for each type of server in the environment, and each agent needs to be managed separately.

Another model of data collection can be described as "agentless" data collection. This type of model provides a centralized service that probes several targets (referred to herein as "data servers") in real time and collects the desired data without the need to install any software agents on the targets. This is sometimes referred to as the "pull" model of data collection Existing techniques using this model are quite limited, however, in that the typically support a limited range of target configurations (and therefore cannot be used in diverse environments), and they generally can only obtain data about hardware or very basic software configurations. Such solutions also typically present security issues, because they require fairly low-level access to the target systems and often are implemented in a manner that is opaque to the operations of the targets.

Hence, there is a need for an improved solution to the problem of data collection.

BRIEF SUMMARY

A set of embodiments provides improved tools and techniques for collecting data from target systems without the need for installation of expensive and high-maintenance software agents on the target systems. In an aspect of certain embodiments, these tools and techniques can be used to collect performance data from collection targets while still allowing the operator(s) of the collection targets to govern the access of the tools, alleviating security concerns. (As used herein, the term "collection target" refers to any computer or other device from which data, including without limitation application performance data, may be collected. Merely by way of example, the data collection techniques of certain embodiments employ scripts, which may be analyzed by the collection target against security policies of that collection target, to ensure that the scripts will not take any actions that might violate such security policies. In another aspect, the tools and techniques may be used to collect data in real time, when it is needed, by transmitting a script for immediate execution by the host system, which could then return the data produced by the script immediately upon completion (and/or as part of execution of the script).

In one embodiment, a data collection server maintains data collection policies for one or more collection targets. When a data collection request for a particular collection target is queued at the collection server, the collection server might refer to the policy to identify a data collection policy, which might describe the data to be collected from that collection target and/or might identify one or more data collection scripts that are to be run on that collection target (in an aspect of certain embodiments, these collection scripts might comprise one or more structured query language statements to be run in a database at the collection target to produce the needed data). The data collection policy might, in certain embodiments, also identify a connection technique for communicating with the collection target (e.g., a direct connection using a secure shell connection, connection through an edge server or other intermediary device, etc.) and/or a set of authentication credentials to be used for communicating with that collection target.

The collection server, in various embodiments, might then execute the collection request, e.g., by establishing communication with the collection target using the identified connection technique, and/or identified authentication credentials, and transmitting the identified data collection script(s) for reception by the collection target. The collection target, upon receiving the data collection scripts, might analyze the scripts to ensure that they comply with any applicable security policies established at the collection target, and assuming the scripts do comply, execute the scripts (e.g., in a database) to produce the desired performance data. This performance data can then be transmitted back to the collection server, which might store the performance data, analyze the performance data (e.g., to identify opportunities to tune applications or other configuration information at the data server for better performance), and/or display the performance data (and/or the results of any analysis) for a user.

The tools provided by various embodiments of the invention include, without limitation, methods, systems, and/or software products. Mainly by way of example, a method might comprise one or more procedures, any or all of which are executed by a computer system. Correspondingly, an embodiment might comprise a computer system configured with instructions to perform one or more procedures in accordance with methods provided by various embodiments. Similarly, a computer program might comprise a set of instructions that are executable by a computer system (and/or a processor therein) to perform such operations. In many cases, such software programs are encoded on physical and/or tangible computer readable media (such as, merely by way of example, optical media, magnetic media, and/or the like).

Merely by way of example, one set of embodiments provides systems, including without limitation systems for collecting performance data. An exemplary system, which can be employed in a database environment comprising one or more data servers, comprises a collection server computer system and a data server computer system. Each computer system comprises one or more processors and a computer readable medium having encoded thereon a set of instructions executable by the respective computer system.

The collection server computer system, for example, might have instructions for maintaining a data collection policy pertaining to the data server computer system. In an aspect, the data collection policy might comprise a set of information specifying how performance data is to be collected from the data server computer system. In another aspect, the set of information might comprise identification of one or more data collection scripts to be run at the data server computer system, identification of a set of authentication credentials for the data server computer system, and/or identification of a connection technique for accessing the data server computer system. The collection server computer system might have further instructions for generating a collection request, which might referencing the data collection policy, and/or instructions for queuing the collection request.

In some embodiments the collection server computer system might have further instructions for executing the collection request. This instructions might include instructions for analyzing the data collection policy to identify the one or more data collection scripts to be run at the data server computer system, the set of authentication credentials for the data server computer system, and/or the connection technique for accessing the data server computer system; instructions for obtaining the identified set of authentication credentials from a lightweight directory access protocol directory server; and/or instructions for initiating communication with the data server computer system based on the identified connection technique. In one aspect initiating communication might authenticating with the data server computer system using the identified set of authentication credentials. The instructions for executing the collection request might further include instructions for transmitting the identified one or more data collection scripts to the data server computer system.

The set of instructions executable by the processor(s) at the data server computer system might include instructions for receiving the one or more data collection scripts transmitted by the collection server computer system, instructions for determining that the one or more data collection scripts do not violate any security policy of the data server computer system, and/or instructions for executing the one or more data collection scripts. In one aspect, executing the one or more data collection scripts might comprise executing one or more structured query language statements on a first database to produce a set of performance data about the database environment. The data server computer system might include further instructions for transmitting, from the data server computer system to the collection server computer system, the set of performance data about the database environment.

In certain embodiments, the instructions executable by the processor(s) at the collection server computer system might further comprise instructions for receiving the set of performance data about the database environment, instructions for storing the set of performance data in a second database using an extract-transform-load tool, instructions for analyzing the set of performance data to determine a performance status of the database environment, and/or instructions for displaying, for a user, information about the performance status of the database environment, based on analysis of the set of performance data.

As noted above, another set of embodiments provides apparatus, including apparatus that comprises software programs. An exemplary apparatus comprises a computer readable storage medium having encoded thereon a set of instructions executable by a computer (such as a collection server computer system, to name one example) to collect performance data about a database environment comprising one or more collection targets. In one embodiment, the set of instructions comprises instructions for maintaining, at a collection server, a data collection policy pertaining to a collection target, the data collection policy comprising a set of information specifying how performance data is to be collected from the collection target. The set of instructions might further comprise instructions for analyzing the data collection policy to identify one or more data collection scripts to be run at the collection target, instructions for initiating communication with the collection target, and/or instructions for transmitting the identified one or more data collection scripts to the collection target. In some cases, the set of instructions further includes instructions for receiving, at the collection server, a set of performance data about the database environment, the set of performance data being generated by execution of the one or more data collection scripts on the collection target, and/or instructions for storing at least a portion of the set of performance data.

In accordance with another set of embodiments, a computer a computer readable storage medium might have encoded thereon a set of instructions executable by a collection target computer system to provide performance data about a database environment. In one embodiment, the set of instructions comprises instructions for receiving a communication from a collection server, instructions for authenticating the collection server, instructions for receiving one or more data collection scripts from the data collection server, instructions for executing the one or more data collection scripts to produce a set of performance data about the database environment, and/or instructions for transmitting the set of performance data.

A further set of embodiments provides methods. An exemplary method of collecting performance data about a database environment comprising one or more collection targets comprises maintaining, at a collection server, a data collection policy pertaining to a collection target, the data collection policy comprising a set of information specifying how performance data is to be collected from the collection target. The method, in some embodiments, might further comprise analyzing the data collection policy to identify one or more data collection scripts to be run at the collection target, initiating communication with the collection target, transmitting the identified one or more data collection scripts to the collection target, and/or receiving, at the collection server, a set of performance data about the database environment. In one aspect, the set of performance data might be generated by execution of the one or more data collection scripts on the collection target. In another aspect, the method might further include storing at least a portion of the set of performance data.

BRIEF DESCRIPTION OF THE DRAWINGS

A further understanding of the nature and advantages of particular embodiments may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1A:
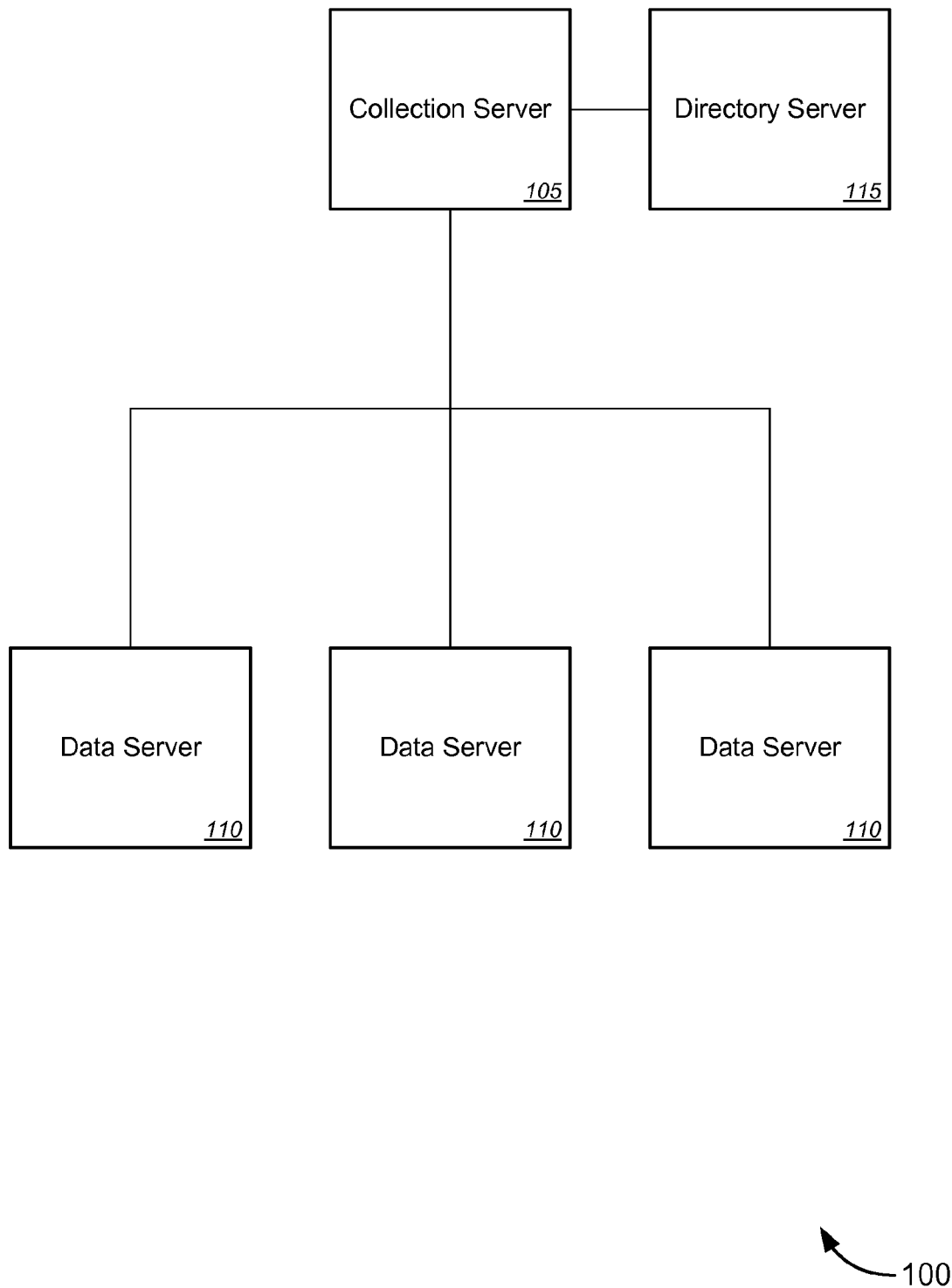
FIGS. 1A, 1B, 1C, and 2 are block diagrams illustrating systems for collecting performance data, in accordance with various embodiments.

While various aspects and features of certain embodiments have been summarized above, the following detailed description illustrates a few exemplary embodiments in further detail to enable one of skill in the art to practice such embodiments. In the following description, for the purposes of explanation, numerous specific details are set forth in order to provide a thorough understanding of the described embodiments. It will be apparent, however, to one skilled in the art that other embodiments of the present invention may be practiced without some of these specific details. In other instances, well-known structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

A set of embodiments provides improved tools and techniques for collecting data from target systems without the need for installation of expensive and high-maintenance software agents on the target systems. While many of the embodiments described herein refer to collection of performance data (including without limitation application performance data) from data servers (such as database servers, application servers, and/or any other type of server from which performance data can be gathered), it should be appreciated that other embodiments may be used to collect a variety of different types of data from any suitable collection target.

In an aspect of certain embodiments, these tools and techniques can be used by a vendor (such as a software vendor, a solutions provider, an information systems support organization, and/or the like) to collect application performance data from customer servers while still allowing the customer to govern the access of the tools, alleviating security concerns. Merely by way of example, the data collection techniques of certain embodiments employ scripts, which may be analyzed by the data server against security policies of that data server, to ensure that the scripts will not take any actions that might violate such security policies. In another aspect, the tools and techniques may be used to collect data in real time, when it is needed, by transmitting a script for immediate execution by the data server, which could then return the data produced by the script immediately upon completion (and/or as part of execution of the script).

In one embodiment, a data collection server maintains data collection policies for one or more data servers from which application performance data (which can include, without limitation, monitoring data, server logs, specific performance data types (processor utilization, file system data, number of requests serviced over a certain period of time, amount of swap file used, number of disk accesses over a certain period of time, etc.), parameters and information about hardware and/or software configuration) is to be collected. When a data collection request for that data server is queued at the collection server, the collection server might refer to the policy to identify a data collection policy, which might describe the data to be collected from that data server and/or might identify one or more data collection scripts that are to be run on that data server. The data collection policy might, in certain embodiments, also identify a connection technique for communicating with the data server (e.g., a direct connection using a secure shell ("SSH") connection, connection through an edge server or other intermediary device, etc.) and/or a set of authentication credentials to be used for communicating with that data server.

The collection server, in various embodiments, might then execute the collection request, e.g., by establishing communication with the collection target using the identified connection technique, and/or identified authentication credentials, and transmitting the identified data collection script(s) for reception by the data server. The collection target, upon receiving the data collection scripts, might analyze the scripts to ensure that they comply with any applicable security policies established at the data server, and assuming the scripts do comply, execute the scripts (e.g., in a database) to produce the desired data. This data can then be transmitted back to the collection server, which might store the data, analyze the data (e.g., to identify opportunities to tune applications or other configuration information at the collection target for better performance), and/or display the data (and/or the results of any analysis) for a user.

FIG. 1A illustrates a block diagram of a system 100 for collecting application performance data. The system 100 comprises a collection server 105 and one or more data servers 110. While the data collection server 105 and each of the data servers 110 are shown in block diagram format on FIG. 1A, it should be appreciated that they generally will have a typical hardware configuration, a generalized example of which is described below with respect to FIG. 8. Similarly, the arrangement of, and communication between the collection server 105 and data servers 110 is discretionary, although FIG. 9 (described below) illustrates one exemplary arrangement.

In certain embodiments, the collection server 105 will include (or be in communication with) a database (not shown on FIG. 1A) for storing application performance data (or other data) collected from the data server(s) 110, along with the necessary software to perform the procedures ascribed herein to the collection server 105. Similarly, in many cases, the data server(s) 110 will have installed and/or will be executing one or more applications about which performance data is to be collected (although, as noted above, different types of data may be collected in certain embodiments, in which case the applications may be unnecessary). Such applications can include, merely by way of example, database software (including without limitation relational database management software such as Oracle Database 11g™), enterprise and/or business application software (examples of which include Oracle Fusion™, Oracle e-Business Suite™, PeopleSoft Enterprise™, JD Edwards EnterpriseOne™, Siebel CRM™, and/or the like), web servers, and/or any other types of applications for which collection of performance data may be useful. In a particular embodiment, a data server 110 may also include (or be in communication with) a database (not shown on FIG. 1A) from which performance data may be obtained. In some cases, the database might be associated with the application for which performance data may be collected.

In some cases, the collection server 105 might be configured to store at the collection server 105 (and/or a data store, such as a database, etc., in communication with the collection server 105) a set of authentication credentials that can be used to authenticate with a data server 110 in order to undertake data collection activities. In other cases, however, the system 100 might implement a directory server 115 (e.g., a lightweight directory access protocol ("LDAP") server) that manages the identities of the data servers 110 (and/or other entities in the network, as known in the art). In some cases, the directory server 115 might include a data store (e.g., a database, file system, etc.) for storing authentication credentials for one or more of the data servers 110. Such authentication credentials may depend on the nature of the authentication scheme employed by each of the data servers, but they can include, without limitation, userids, passwords, certificates, and/or the like. In yet other cases, any other appropriate device might store such authentication credentials.

In one embodiment, a collection server 105 may interface directly with a data server 110a, albeit through a network that might comprise a plurality of typical networking devices, for example by authenticating with that data server 110a and transmitting data collection scripts to that data server 110a to collect data from that server.

Figure 1B:
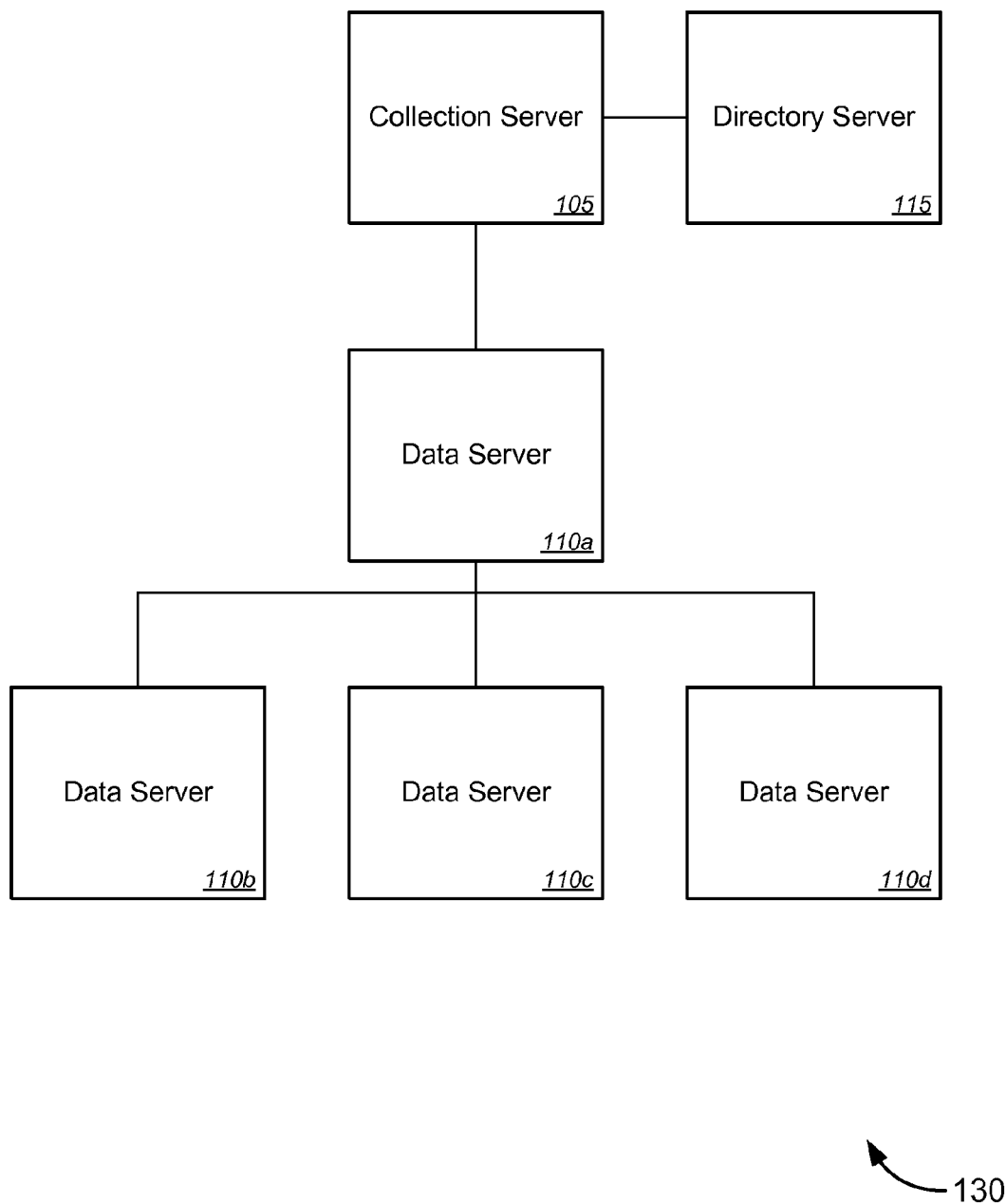

As illustrated by FIG. 1B, in other embodiments, including without limitation situations in which one or more data servers 110 are behind a firewall), the system 100 might employ a first data server 110a as an edge server. This edge data server 110a might handle communication between a collection server 105 and one or more other data servers 110b-d. This configuration can also provide fault tolerance (for example, two or more of the data servers 110 might be configured to serve as edge servers for other data servers 110). In such a configuration, a data server 110a effectively acts as a collection server for one or more other data servers 110b-d; it can receive a collection request from the collection server 105 and forward that collection request (including any data collection scripts) to the appropriate data server (e.g., 110b) for execution. The edge server 110a then can collect the data from the other data servers 110b-d and transmit all of the collected data to the collection server 105 for analysis and/or storage.

Figure 1C:
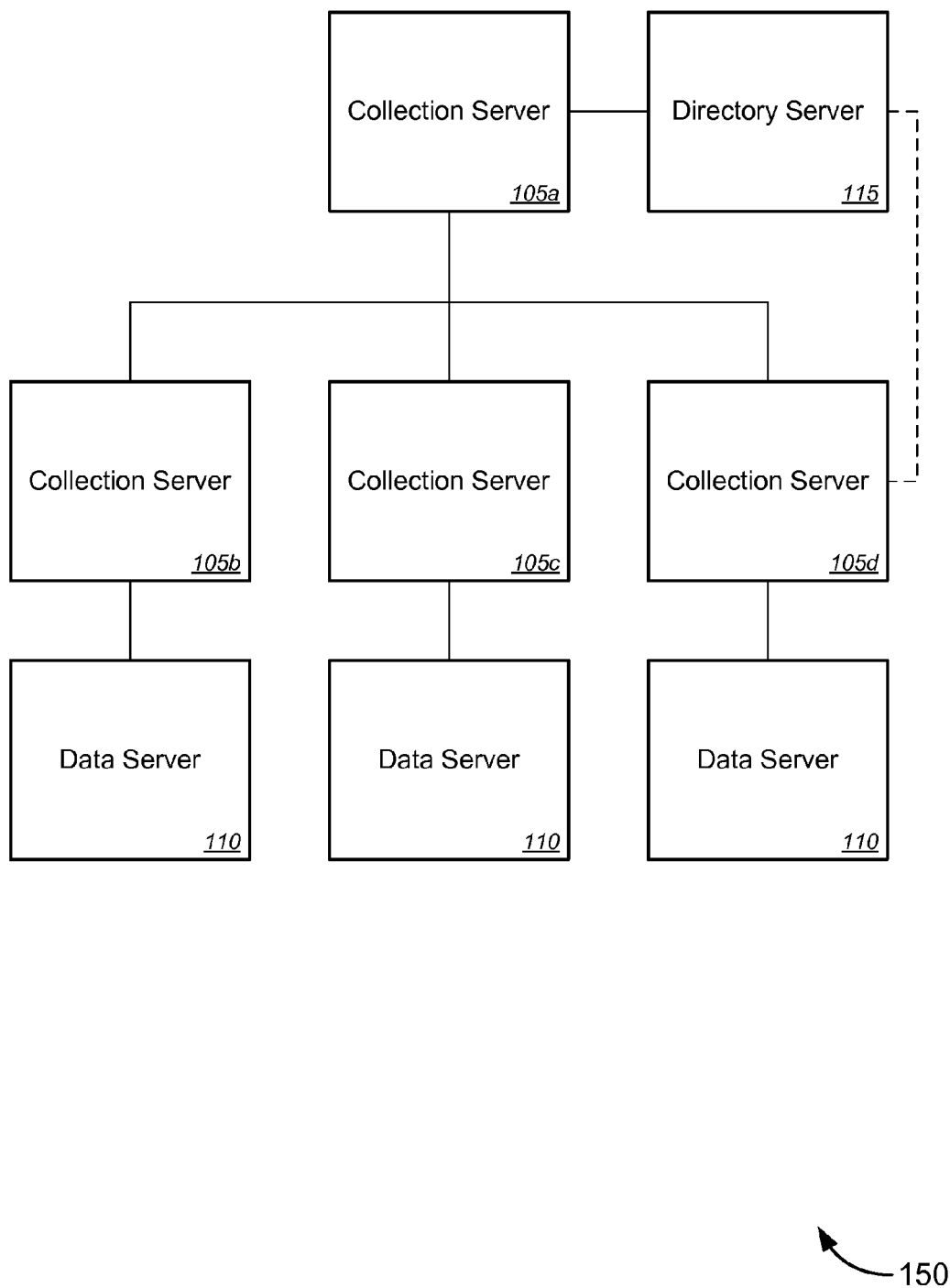

It should be noted, of course, that the edge servers need not actually be a data server from which data is collected. In other embodiments, as illustrated by FIG. 1C, a centralized collection server 105a might be in communication with one or more edge collection servers 105b-d, which in turn may be in communication with one or more data servers 110. The edge collection servers 105b-d might perform data collection activities as described herein, either on their own initiative or based on collection requests received from the centralized collection server 105a, and forward the collected data to the centralized collection server 110a for storage and/or analysis (or, alternatively, might perform the analysis themselves and merely forward the results of the analysis to the centralized collection server 105a). In such cases, the edge collection servers 105b-d might obtain collection policy information (including scripts, credentials, and/or the like from the centralized collection server 105a) and/or might store that information locally. In some cases, the edge collection servers 105b-d might access the directory server 115 directly to obtain authentication credentials for the data servers 110; in other cases, the centralized collection server 105a might obtain such credentials and forward them to the appropriate edge collection server.

Figure 2:
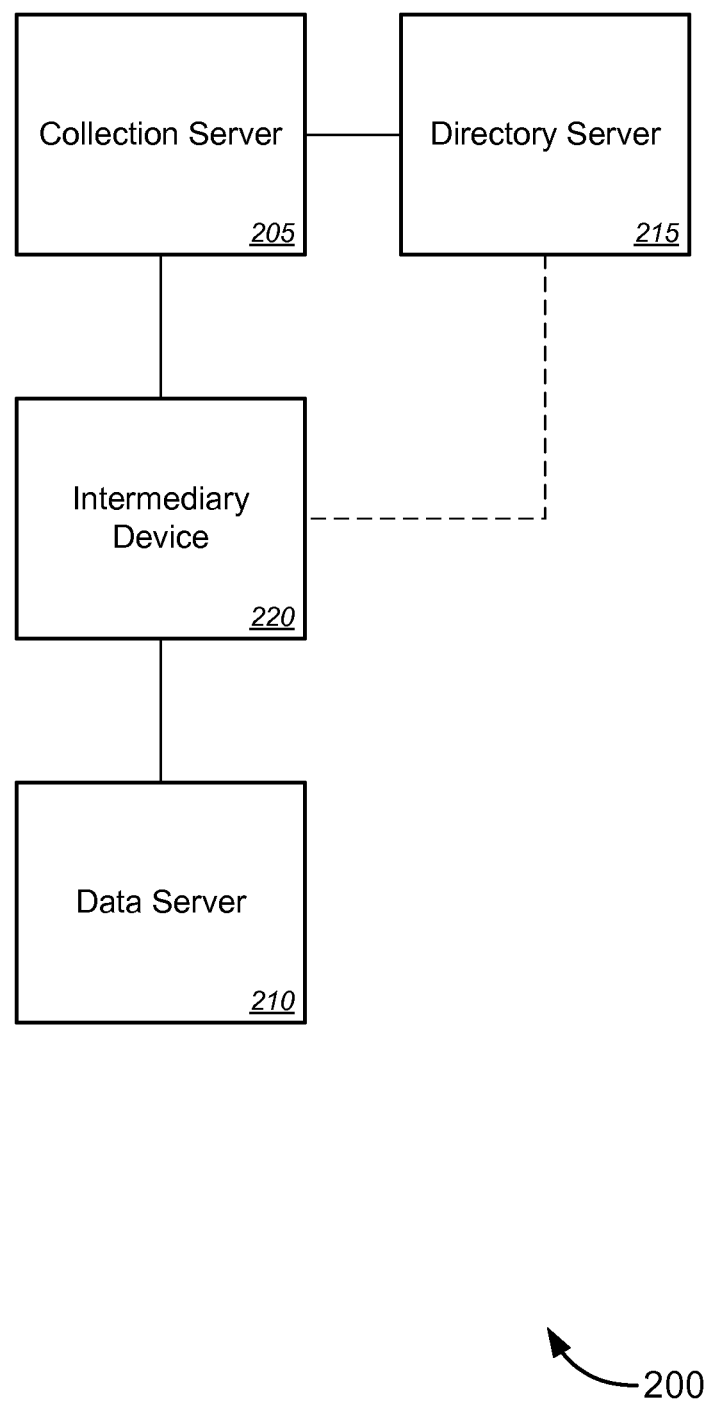

FIG. 2 illustrates a system 200 that employs a feature that may be beneficial in some embodiments. FIG. 2 includes a collection server 205, a data server 210, and a directory server 215 that are similar to their counterparts 105 and 110, respectively, in FIG. 1. The system 200 of FIG. 2, however, includes an intermediary device 220, which effectively serves as a proxy for the collection server 205. An intermediary device 220 can be any device that is configured to facilitate communication between a collection server and a data server. Examples can include edge servers (as described above), dedicated devices that serve as proxies for the collection servers, SSH intermediaries (as described below), and/or the like.

The configuration illustrated by FIG. 2 can be beneficial in situations in which the collection server 205 cannot (or should not) have direct access to the data server 210 (whether because of network topology, security concerns, or the like). For example, in some cases it may be administratively advantageous to configure the collection server to access a single intermediary device, which then would handle communications with a plurality of connection targets. As another example, in some cases, a vendor might operate a collection server to collect performance about that vendor's application from a customer's data server. The customer, for security reasons, might not allow the vendor to have authentication credentials for that data server, but could provide the vendor with access to an intermediary device, which could authenticate with the data server and provide a communication channel between the collection server and the data server.

In the system 200 of FIG. 2, the collection server 205 communicates with the intermediary device 220, which in turn communicates with the data server 210. Merely by way of example, if an SSH session is used to communicate with the data server 210, the collection server 205 might transmit a collection request (including any necessary collection scripts) to the intermediary device 220, which stores (and/or has access to) authenticate with the data server 210 via SSH. The intermediary device 220 can then transmit the collection scripts to the data server 210. In an alternative embodiment, the intermediary device 220 might simply open the SSH connection with the data server 210 and thereafter allow the collection server 205 to communicate with the data server 210. Merely by way of example, as SSH is often implemented as a two-way protocol (with messages passing in both directions between both the SSH client and the SSH host), the intermediary device 220 can pass SSH-based messages from the collection server 205 to the data server 210 and/or from the data server 210 to the collection server 205. In an aspect, the intermediary device may be configured to intercept and modify messages as appropriate, so that it appears to the data server 210 that it is communicating exclusively with the intermediary device 220. In this way, the data server 210 need not even be aware of the existence of the collection server 205.

In some cases, the collection server 205 might store (and/or obtain from the directory server 215) authentication credentials for the data server 210, in the manner described above. In other cases, however, the collection server 205 might not have access to these security credentials (e.g., for security purposes or other administrative reasons). In such cases, the intermediary device 220 might store the necessary credentials itself and/or be configured to obtain them from a directory server 215, similar to the manner in which the collection server 105 stores and/or obtains the credentials in the system 100 of FIGS. 1A-C.

It should be noted that, while depicted as separate embodiments, the features of the systems 100, 130, 150, and 200 of FIGS. 1A-C and 2 may be combined as appropriate. Merely by way of example, in some cases, a collection server might communicate directly with some data servers and might receive performance data from edge collection servers about other data servers. Likewise, the centralized collection server and/or the edge collection servers might communicate with one or more data servers through intermediary devices.

FIGS. 3-7 illustrate various methods that can be used to produce, provide and/or collect data, including without limitation, application performance data, from collection targets such as data servers. While the methods of FIGS. 3-7 are illustrated, for ease of description, as different methods, it should be appreciated that the various techniques and procedures of these methods can be combined in any suitable fashion, and that, in some embodiments, the various procedures depicted by FIGS. 3-7 can be considered interoperable and/or as portions of a single method. Moreover, while the methods illustrated by FIGS. 3-7 can be implemented by (and, in some cases, are described below with respect to) the systems 100, 130, 150, and 200 of FIGS. 1A-C and 2 (or components thereof), these methods can be implemented using any suitable hardware implementation. Similarly, while the systems 100, 130, 150, and 200 of FIGS. 1A-C and 2 (and/or components thereof) can operate according to the methods illustrated by FIGS. 3-7 (e.g., by executing instructions embodied on a computer readable medium), these systems can also operate according to other modes of operation and/or perform other suitable procedures. While the methods illustrated by FIGS. 3-7 are described with respect to collecting data from a single collection target, it should be appreciated that in many cases, a collection server might collect data from a plurality of collection targets, and that the methods described below can be performed on a plurality of collection targets (either serially or in parallel).

Figure 3:
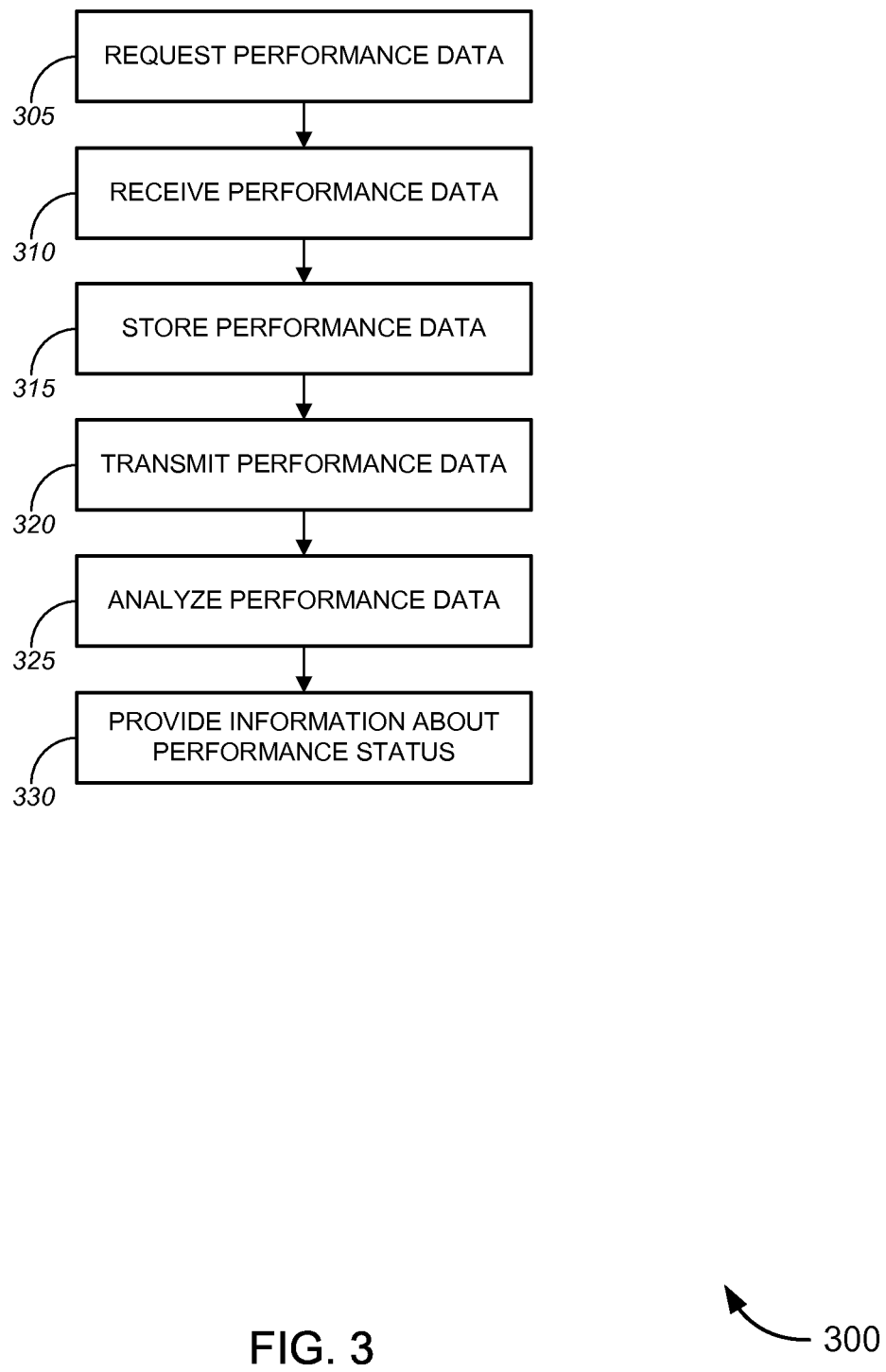
FIG. 3 is a process flow diagram illustrating a method of collecting performance data, in accordance with various embodiments.
Figure 4:
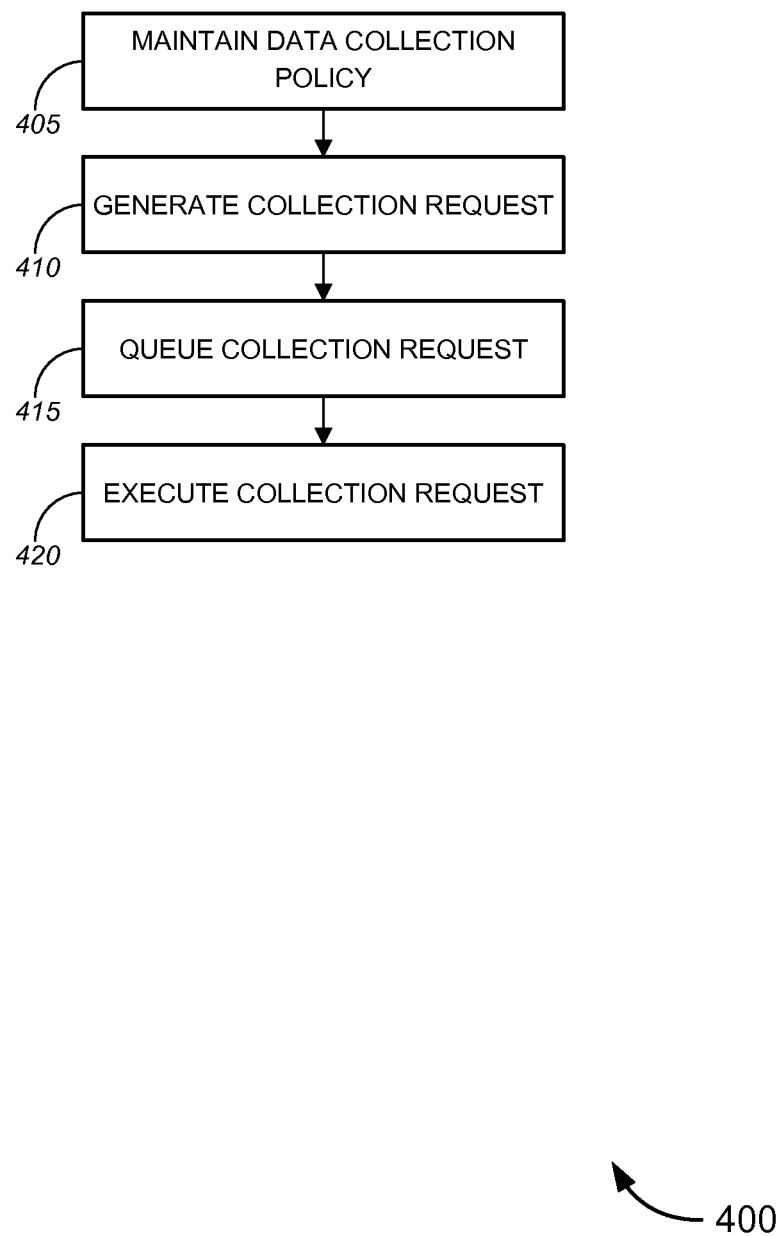
FIG. 4 is a process flow diagram illustrating a method of requesting performance data, in accordance with various embodiments

FIG. 3 illustrates a method 300 of collecting data, in accordance with one set of embodiments. As noted above, the method 300 is particularly well-suited for collecting application performance data (and is described in that respect), although the method 300 can be used to collect any type of suitable data in accordance with various embodiments. The method 300 comprises requesting data (which might be performance data, as illustrated by FIG. 3, or any other suitable type of data) from a collection target, such as a data server (block 305). There are a variety of techniques that may be used to request data. Merely by way of example, requesting data might comprise transmitting a request message to the collection target. In a particular set of embodiments, however, requesting performance data comprises executing a data collection request at a collection server, based on a data collection policy. FIG. 4, described in detail below, illustrates a method of executing a data collection request in accordance with one set of embodiments.

The method 300, in some cases, further comprises receiving the performance data at the collection server (block 310). In many cases, the performance data will ultimately generated at the collection target; however, depending on the embodiment, the data might be received from a device other than the collection target. Merely by way of example, in some cases, the data might be received from an intermediary device and/or an edge server (examples of which are described above) which receives the data from the collection target (and/or from another edge server, intermediary device, etc.).

In accordance with some embodiments, the method 300 further comprises storing the received performance data (block 315). In an exemplary embodiment, the received performance data may be stored in a database at the collection server (or in communication with the data server). In other cases, the performance data can be stored in any suitable arrangement (such as a file system, etc.). In a particular set of embodiments, storing the performance data comprises loading the performance data into a database using an extract-transform-load ("ETL") tool.

In some cases, the collection server that requested the performance data might not be the server that is configured to permanently store or analyze the data. An example of such an embodiment is a system in which an edge collection server requests data from a collection target, but in which a centralized collection server stores and/or analyzes the data. In such cases, the collection target might transmit the data directly to the centralized collection server. In other cases, however, the collection target might provide the data to the requesting collection server. In this situation, the requesting collection server might transmit the received data (block 320), for example to a centralized collection server for storage and/or analysis.

In accordance with one set of embodiments, the method 300 further comprises analyzing the received performance data (block 325). This analysis may be conducted by a collection server, and in particular a centralized collection server. Alternatively and/or additionally, the data collected by the collection server may be provided to a different computer system for analysis (e.g., by storing the data in a database accessible by that computer system). In either case, analyzing performance data can comprise any of a variety of operations. Merely by way of example, in some cases, the collected performance data might be analyzed to identify any performance parameters that might indicate a performance problem and/or compared against baseline or "normal" values to identify performance problems. For instance, if the performance data for a particular collection target indicates higher-than-expected processor utilization, analysis of that performance data might highlight that performance parameter as indicating a problem. In other cases, analyzing performance data might identify tuning opportunities; merely by way of example, the analysis might compare operating system and/or application settings against settings determined (by a tuning tool, etc.) to be optimal for that collection target.

In the illustrated embodiment, the method 300 further comprises providing information (e.g., to a user, another computer system, etc.) about the performance status of the collection target (block 330). Merely by way of example, in some cases, information about the performance status of the collection target might be displayed on a display device for a user. In another example, information about the performance status might be provided to a monitoring application or system (which might reside on the collection server or on a different computer system). In some cases, providing information about performance status might comprise displaying any identified performance data that indicates a performance problem and/or tuning opportunity. In other cases, the information about the performance status might include suggestions to remedy any performance problems and/or implement any configuration modifications to tune an application at the collection target.

FIG. 4 illustrates a method 400 of executing a data collection request, in accordance with one set of embodiments. As noted above, executing a data collection request can be used to request data from a collection target in accordance with one set of embodiments. In an aspect of some embodiments, each data collection request is governed by a data collection policy, which specifies the details of the data collection requests. Hence, at block 405, the method 400 comprises maintaining a data collection policy. In a set of embodiments, the data collection policy is maintained at a collection server. Maintaining a data collection policy may comprise any of a variety of operations, including without limitation creating a data collection policy for one or more collection targets, storing such a data collection policy (e.g., as a record in a database), modifying a data collection policy, consulting a data collection policy when generating a data collection request, and/or the like.

In general, a data collection policy specifies how (and/or what) information is to be collected from a particular collection target. (In many cases, each collection target will have an individual data collection policy associated therewith, but in some cases, a single policy might apply to multiple targets.) Hence, a data collection policy might comprise a variety of different data elements (which might be represented by fields in a database record, tagged elements in an eXtensible Markup Language ("XML") file, and/or any other suitable format). Merely by way of example, a data collection policy might comprise an identification (by hostname, IP address, MAC address and/or another other suitable identifier) of the collection target(s) to which the data collection policy applies. In some cases, a data collection policy might specify a schedule (e.g., hourly, daily, weekly, monthly, etc.) on which a data collection request should be executed in accordance with that data collection policy.

A data collection policy typically will also specify what data is to be collected from a collection target and/or how that data is to be collected. Merely by way of example, a data collection policy might identify a set of parameters whose values should be collected. In a particular set of embodiments, data (including in particular application performance data) is collected from collection targets through using collection scripts that are executed at each collection target. In certain embodiments, a collection script may be configured to run in a database at the collection target. For example, a collection script might comprise a set of one or more structured query language ("SQL") statements that can be executed in a database at the collection target to produce the desired data. Accordingly, a data collection policy might identify one or more data collection scripts that are to be executed at the collection target to collect the desired data. The data collection scripts to run in accordance with a particular policy might be identified by storing those scripts in the policy itself. Alternatively and/or additionally, the scripts might be stored in another location, and the data collection policy might reference that location (by uniform resource identifier ("URI"), file path, filename, etc.).

As noted above, in accordance with different embodiments, there are a variety of ways in which a collection server might communicate with a collection target (including, without limitation, connecting directly with the collection target, connecting via an intermediary device, etc.) Accordingly, in some cases, a data collection policy will specify how the collection server should communicate with the collection target by identifying a connection technique for accessing a collection target. In some cases, identifying a connection technique might comprise identifying a protocol (such as SSH, etc.) that should be used for communicating with the collection target. In other cases, identifying a connection technique might comprise identifying an edge server and/or intermediary device that provides access to the collection target.

The data collection policy might further identify a set of authentication credentials to be used to access the collection target. In some cases, the credentials themselves might be stored in the data collection policy. In other cases, the policy might identify the credentials by referencing another location (e.g., an entry in a directory server) from which the credentials may be obtained.

The method 400, in some embodiments, further comprises generating a collection request (block 410). In some cases, a collection request is generated automatically, e.g., according to a schedule specified by a data collection policy. (In such cases, the collection server might execute a daemon or service that is configured to generate collection requests according to schedules specified by data collection polices.). In other cases, a collection request might be generated ad hoc and/or on demand (for instance, based on user input requesting the collection of data from a particular collection target, based on a request received from another application or computer system, etc.). A collection request might reference a data collection policy that defines the request. Optionally (for example, if there are multiple collection requests to be processed by the collection server), the collection server might queue the generated collection request (block 415). The collection server then executes the collection request (block 420). Executing a collection request can comprise any operations that initiate the process of obtaining the desired data from a collection target.

Figure 5:
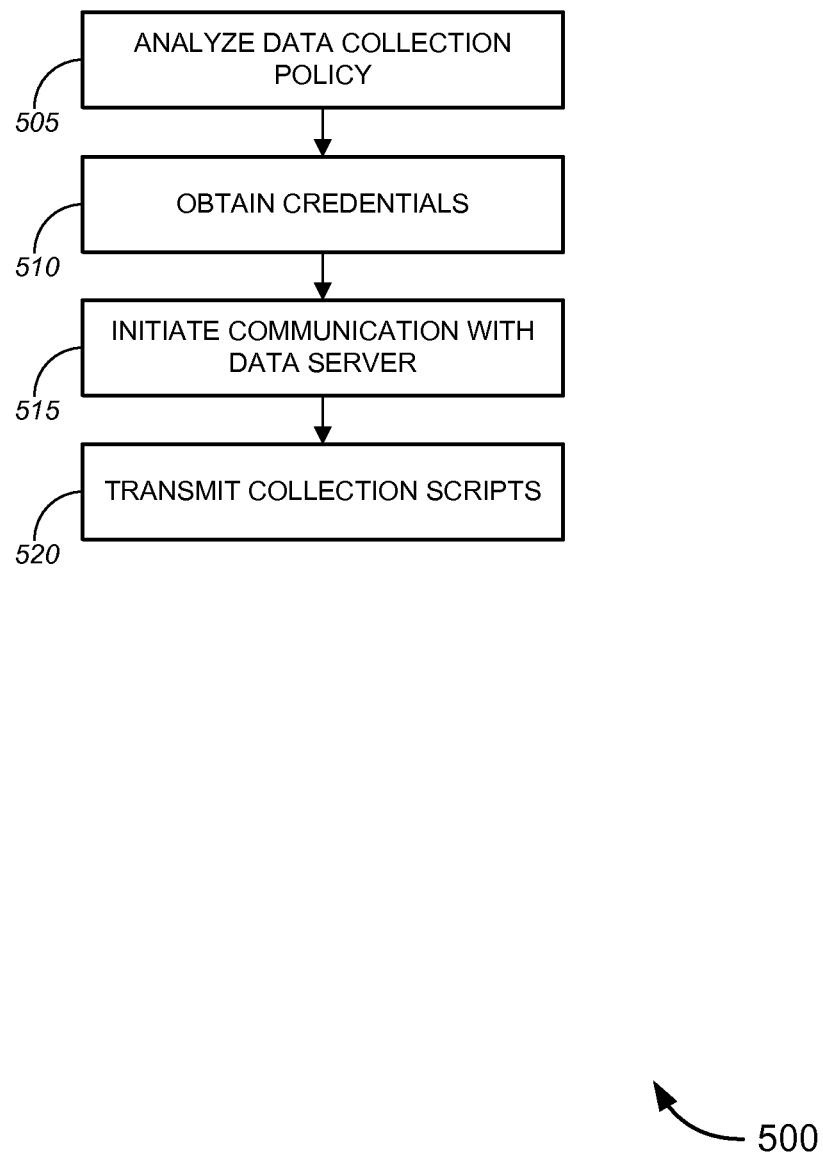
FIG. 5 is a process flow diagram illustrating a method of executing a collection request, in accordance with various embodiments.

Merely by way of example, FIG. 5 illustrates a method 500 of executing a collection request. The method 500 comprises, in the illustrated embodiment, analyzing a data collection policy (block 505). In one aspect, a data collection policy may be analyzed to determine how the collection request should be executed. Merely by way of example, the collection server might analyze the data collection policy to identify the collection target and/or one or more data collection script(s) that should be transmitted to the collection target. Analyzing the data collection policy might further comprise identifying the appropriate authentication credentials to be used to authenticate at the collection target and/or identifying the appropriate connection technique for that collection target. In other words, analyzing a data collection policy may comprise determining how the collection server should implement the collection of data to comport with the data collection policy.

In some embodiments, the method 500 further comprises obtaining a set of authentication credentials identified by the data collection policy (block 510). In embodiments that store the credentials within the data collection policy, obtaining the credentials might be intrinsic with analyzing the data collection policy (e.g., when the data collection policy is read, the collection server might load into memory any authentication credentials, such as userid, password, certificate, etc. stored in the policy). As noted above, however, in some embodiments, the credentials might be stored in a location (such as a directory server) other than the data collection policy itself. Accordingly, obtaining the credentials might comprise accessing a location specified by the data collection policy to read and/or download the appropriate credentials.

At block 515, the method 500 comprises initiating communication with the collection target (e.g., a data server identified in the data collection policy). In many embodiments, the operations for initiating communication with the data server are determined by the data collection policy. For instance, if the data collection policy specifies a connection technique for communicating with the collection target, initiating communication with the collection target might comprise initiating communication using the specified connection technique. Similarly, if the data collection policy identifies a set of authentication credentials to be used to access the collection target, initiating communication might comprise authenticating with the collection target using those credentials. Merely by way of example, if the data collection policy specifies that the connection technique is an SSH session and that a userid of USERID and a password of PASSWORD should be used to authenticate, initiating communication with the collection target might comprise logging on to the collection server using a secure shell, with the USERID and PASSWORD combination.

Figure 6:
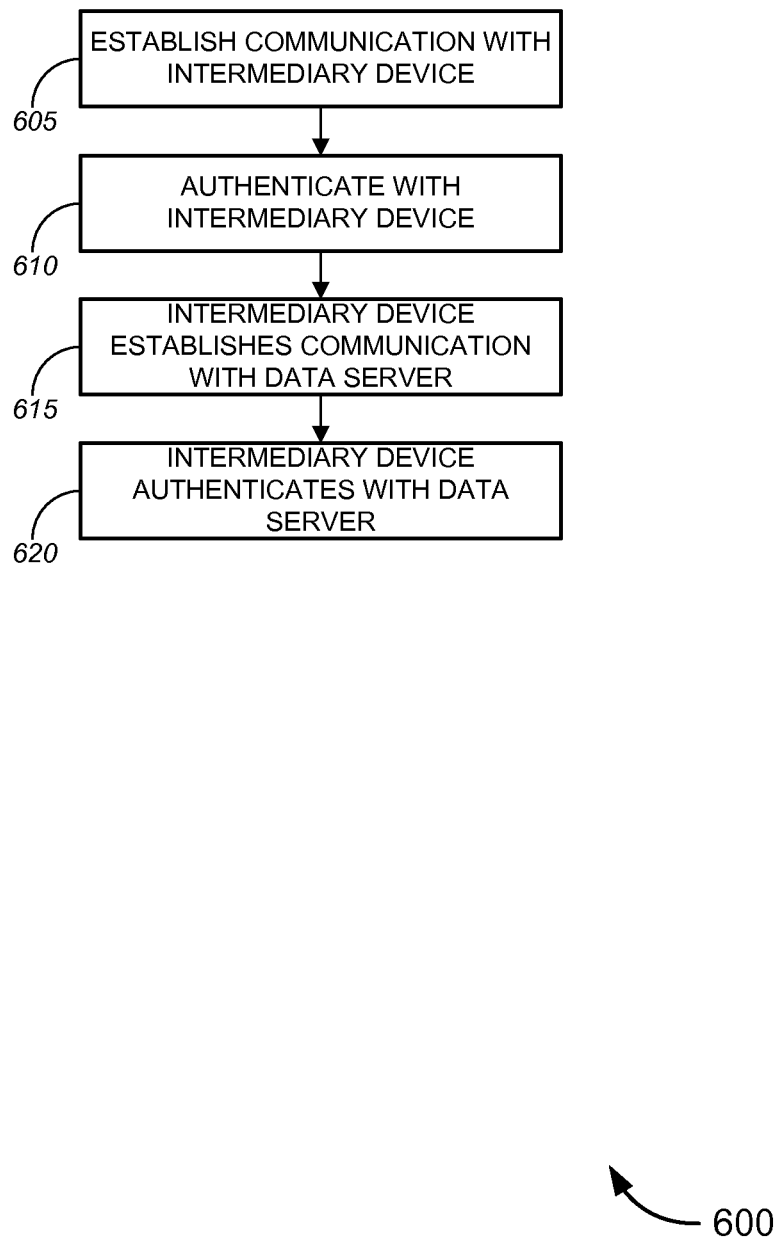
FIG. 6 is a process flow diagram illustrating a method of establishing communication with a data server, in accordance with various embodiments.

In cases in which the data collection policy specifies the use of an intermediary device, the procedures for initiating communication with the collection target may be somewhat more complex. For example, FIG. 6 illustrates one possible method 600 of initiating communication with a collection target using an intermediary device, in accordance with one set of embodiments. The method 600 comprises the collection server establishing communication with an intermediary device (block 605). In many cases, the nature of this communication may be specified by the data collection policy. In an aspect, the procedures for establishing communication with an intermediary device (e.g., opening a communication channel, authenticating with the intermediary device) may be similar to the procedures for initiating direct communication with a collection target. Accordingly, the collection server, in an embodiment, authenticates with the intermediary device (block 610), perhaps using credentials stored in (and/or identified by) a data collection policy.

As part of initiating communication with the intermediary device, the collection server might provide an identification of the collection target for which a communication channel needs to be established. In other embodiments, the identify of the communication target might be implicit (e.g., the intermediary device might be configured to provide communication with only one collection target, such that explicit identification of the collection target is unnecessary).

At block 615, the intermediary device establishes communication with the data server (or other collection target). Since the intermediary device effectively acts as a proxy for the collection server, the process undertaken by the intermediary device to establish communication with the collection target often will be similar to the process a collection server would undertake to establish direct communication with the collection target. For example, the intermediary device typically will authenticate with the collection target (block 620). In some cases, the intermediary device may authenticate using credentials provided by the collection server. In many cases, however, as described above, the collection server will not have access to authentication credentials for the collection target (hence the use of the intermediary device), so the intermediary device may store the authentication credentials itself and/or may obtain the credentials from another source (such as a directory server, etc.).

Returning to the method 500 of FIG. 5, once communications with the collection target have been established (either directly, through an intermediary device, or otherwise), the collection server transmits a data collection request over the established communication channel (block 520); this data collection request might comprise one or more data collection scripts and/or any other appropriate information, such as instructions on how the scripts should be executed, where data produced by the scripts should be provided, etc. (although some or all of this information might be included in the scripts themselves, such that the collection server might simply transmit the data collection scripts and nothing else). In an aspect of some embodiments, the transmitted data collection scripts are those scripts identified by a data collection policy that defines the operative collection request. In embodiments employing an intermediary device, the collection server may send the data collection scripts to the intermediary device, which will in turn transmit the collection scripts to be received by the collection target. Similarly, an edge server may forward the collection scripts received from a centralized collection server to be received by the collection target.

Figure 7:
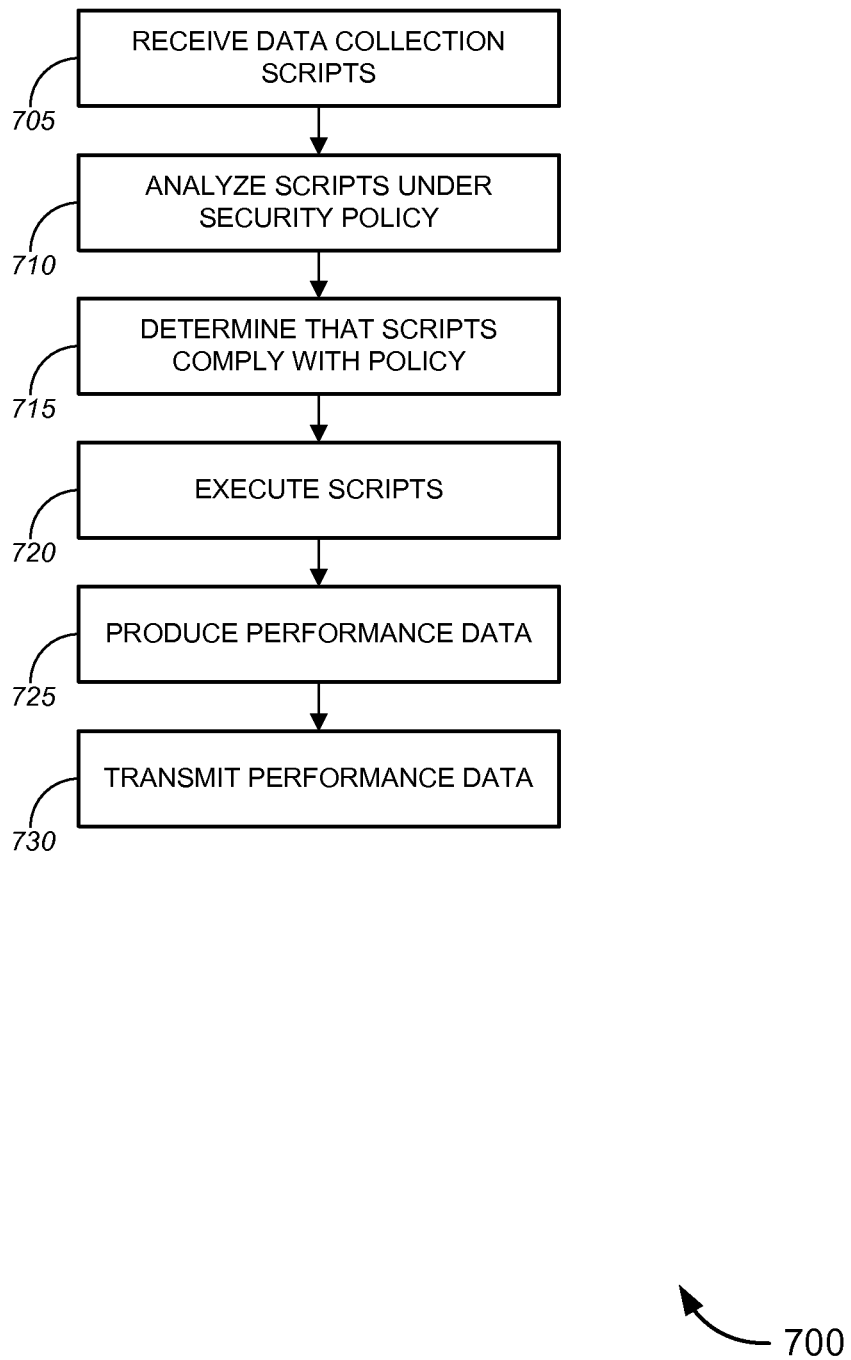
FIG. 7 is a process flow diagram illustrating a method of producing performance data at a data server, in accordance with various embodiments.

FIG. 7 illustrates a method 700 and may be performed by a data server (or other collection target) to provide data (including without limitation application performance data) in response to a collection request received from a collection server. (In an aspect of some embodiments, the source of the collection request is immaterial to the collection target, so whether the request is received directly from a centralized collection server, an edge server, or an intermediary device, similar processes may be used to respond to the collection request.

At block 705, the collection target receives the data collection scripts (from a collection server, intermediary device, etc.). As noted above, one beneficial feature of certain embodiments is the ability to ensure that the data collection efforts do not compromise the security of the collection target; hence, in some embodiments, the data collection scripts are not obfuscated (e.g. compile this binary, encrypted, etc.) and may in fact comprise plaintext, such as a series of SQL statements, shell commands, Perl scripts, etc. In such embodiments, the data collection scripts can be parsed and/or analyzed by the collection target to ensure that they contain no commands that might compromise the security of that collection target.

Accordingly, in a set of embodiments, the method 700 comprises analyzing one or more of the received data collection scripts under one or more security policies of the collection target (block 710). The procedures performed by the collection target to undertake this analysis may vary according to the nature of the security policies implemented on the collection target. Merely by way of example, the collection target may have a "blacklist" of shell commands, SQL commands, etc. that are not allowed to be executed as part of the data collection scripts; if a received data collection script contains such a command, it may be flagged as suspect by the collection target, and/or the collection target may refuse to execute that script. As another, more restrictive, example, the collection target may have a "whitelist" of commands that are allowed to be executed by a data collection script, such that if a received script contains any commands not on this white list, the script will be flagged as suspect and/or the collection target will not execute the script at issue. If a data collection script is flagged as suspect, a message may be sent to an administrator of the collection target to allow the administrator to review the script manually in order to determine whether it should be executed. If a script cannot be executed by the collection target, the collection target may transmit an error message for reception by the collection server (or other device) making the collection request.

In other embodiments, the analysis of the data collection scripts may be more sophisticated and/or complex. Merely by way of example, a received data collection script may be executed in a "sandbox" environment to determine whether the script should be executed in the production environment of the collection target. As another example, data collection scripts may be digitally signed and/or otherwise certified by the collection server, and analyzing a data collection script may comprise verifying the signature and/or certification.

At block 715, the collection target determines (e.g., based on its analysis of the data collection scripts) that the scripts comply with the security requirements of the collection target (e.g., that they do not violate any security policy of the collection target), and at block 720, the collection target executes the data collection scripts. The procedures for executing data collection scripts often will vary based on the nature of those scripts. Merely by way of example, a script comprising shell commands, Perl programs, etc. may be executed in an operating system shell of the collection target, while a script file comprising SQL statements typically will be executed in a database on (or in communication with) the collection target. In some cases, the scripts themselves may contain directives instructing the collection target on the environment in which the scripts should be run; in other cases, the data collection request transmitted by the collection server may include a separate "packing list" that provides instructions to the collection target on executing the data collection scripts. In any event, certain embodiments provide a mechanism to allow automated execution of the collection scripts at the collection target, in order to reduce administrative overhead. (Of course in other embodiments, administrator interaction may be employed in execution of the scripts.)

Typically, execution of the data collection scripts will produce a set of data (e.g., application performance data) at the collection target (block 725). In an exemplary embodiment, the data collection scripts are designed to be run in a database environment (e.g., in a database management system and/or in an operating system of a computer hosting the database), and the data produced by the execution of these scripts includes performance information about the database environment. This data than can be transmitted by the collection target (block 730). Typically, the produced data will be transmitted to whatever device provided the data collection scripts to the collection target, although the collection request may specify that the data should be sent to another location (for example, an edge server may specify that the data set should be transmitted directly to a centralized collection server). If the data is transmitted to a device other than a centralized collection server (e.g., an intermediary device, an edge server, and/or the like), that device may, in some cases, forward the data (and/or any analysis based on the data, etc.) to a centralized collection server for storage and/or further analysis.

Figure 8:
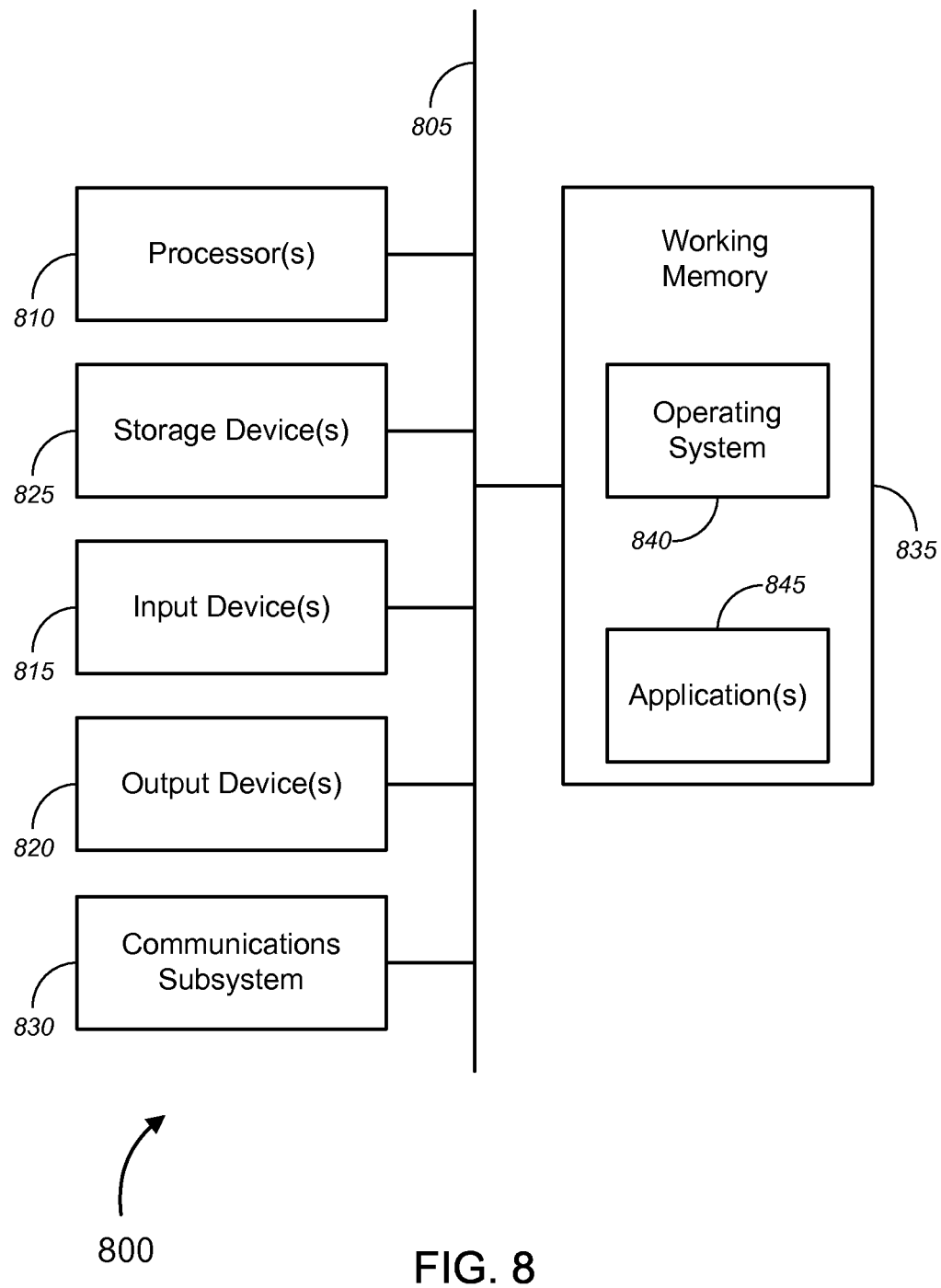
FIG. 8 is a generalized schematic diagram illustrating a computer system, in accordance with various embodiments of the invention.

FIG. 8 provides a schematic illustration of one embodiment of a computer system 800 that can perform the methods provided by various other embodiments, as described herein, and/or can function as a collection server, collection target, intermediary device, and/or the like. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, and/or the like); one or more input devices 815, which can include without limitation a mouse, a keyboard and/or the like; and one or more output devices 820, which can include without limitation a display device, a printer and/or the like.

The computer system 800 may further include (and/or be in communication with) one or more storage devices 825, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 830 may permit data to be exchanged with a network (such as the network described below, to name one example), other computer systems, and/or any other devices described herein. In many embodiments, the computer system 800 will further comprise a working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer readable storage medium, such as the storage device(s) 825 described above. In some cases, the storage medium might be incorporated within a computer system, such as the system 800. In other embodiments, the storage medium might be separate from a computer system (i.e., a removable medium, such as a compact disc, etc.), and or provided in an installation package, such that the storage medium can be used to program, configure and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer readable medium, such as one or more of the storage device(s) 825. Merely by way of example, execution of the sequences of instructions contained in the working memory 835 might cause the processor(s) 810 to perform one or more procedures of the methods described herein.

The terms "machine readable medium" and "computer readable medium," as used herein, refer to any medium that participates in providing data that causes a machine to operation in a specific fashion. In an embodiment implemented using the computer system 800, various computer readable media might be involved in providing instructions/code to processor(s) 810 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical and/or magnetic disks, such as the storage device(s) 825. Volatile media includes, without limitation, dynamic memory, such as the working memory 835. Transmission media includes, without limitation, coaxial cables, copper wire and fiber optics, including the wires that comprise the bus 805, as well as the various components of the communication subsystem 830 (and/or the media by which the communications subsystem 830 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punch-cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800. These signals, which might be in the form of electromagnetic signals, acoustic signals, optical signals and/or the like, are all examples of carrier waves on which instructions can be encoded, in accordance with various embodiments of the invention.

The communications subsystem 830 (and/or components thereof) generally will receive the signals, and the bus 805 then might carry the signals (and/or the data, instructions, etc. carried by the signals) to the working memory 835, from which the processor(s) 805 retrieves and executes the instructions. The instructions received by the working memory 835 may optionally be stored on a storage device 825 either before or after execution by the processor(s) 810.

Figure 9:
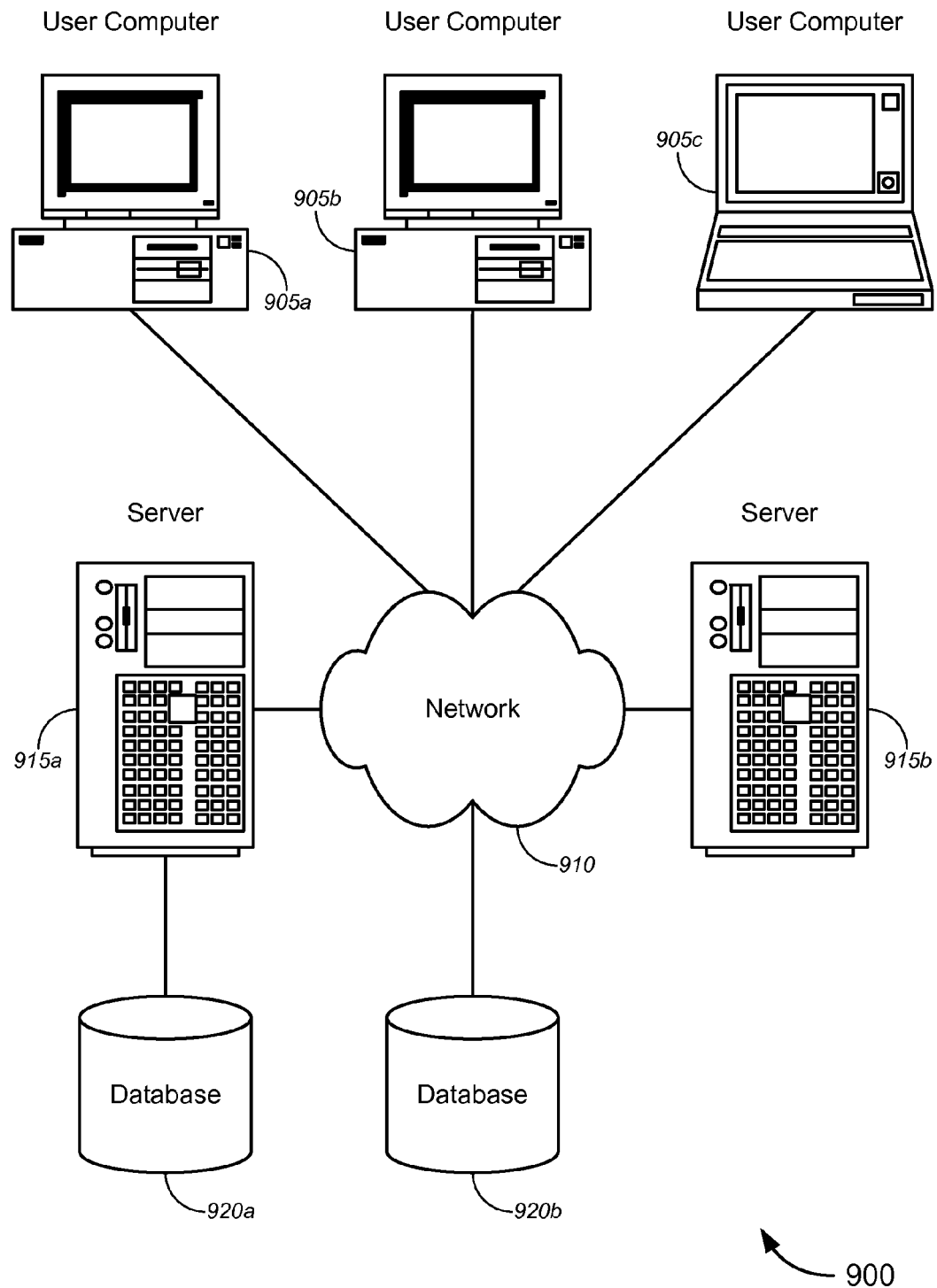
FIG. 9 is a block diagram illustrating a networked system of computers, which can be used in accordance with various embodiments.

As noted above, a set of embodiments comprises systems for collecting data, including application performance data, from collection targets. Merely by way of example, FIG. 9 illustrates a schematic diagram of a system 900 that can be used in accordance with one set of embodiments. The system 900 can include one or more user computers 905. The user computers 905 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 905 can also have any of a variety of applications, including one or more applications configured to perform methods provided by various embodiments (as described above, for example), as well as one or more office applications, database client and/or server applications, and/or web browser applications. Alternatively, the user computers 905 can be any other electronic device, such as a thin-client computer, Internet-enabled mobile telephone, and/or personal digital assistant, capable of communicating via a network (e.g., the network 910 described below) and/or displaying and navigating web pages or other types of electronic documents. Although the exemplary system 900 is shown with three user computers 905, any number of user computers can be supported.

Certain embodiments of the invention operate in a networked environment, which can include a network 910. The network 910 can be any type of network familiar to those skilled in the art that can support data communications using any of a variety of commercially-available (and/or free or proprietary) protocols, including without limitation TCP/IP, SNA, IPX, AppleTalk, and the like. Merely by way of example, the network 910 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 915. Each of the server computers 915 may be configured with an operating system, including without limitation any of those discussed above, as well as any commercially (or freely) available server operating systems. Each of the servers 915 may also be running one or more applications, which can be configured to provide services to one or more clients 905 and/or other servers 915.

Merely by way of example, one of the servers 915 may be a web server, which can be used, merely by way of example, to process requests for web pages or other electronic documents from user computers 905. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 905 to perform methods of the invention.

The server computers 915, in some embodiments, might include one or more application servers, which can be configured with one or more applications accessible by a client running on one or more of the client computers 905 and/or other servers 915. Merely by way of example, the server(s) 915 can be one or more general purpose computers capable of executing programs or scripts in response to the user computers 905 and/or other servers 915, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle, Microsoft, Sybase™, IBM™ and the like, which can process requests from clients (including, depending on the configuration, dedicated database clients, API clients, web browsers, etc.) running on a user computer 905 and/or another server 915. In some embodiments, an application server can create web pages dynamically for displaying the information in accordance with various embodiments, such as displaying collected data and/or analysis of that data for a user. Data provided by an application server may be formatted as one or more web pages (comprising HTML, JavaScript, etc., for example) and/or may be forwarded to a user computer 905 via a web server (as described above, for example). Similarly, a web server might receive web page requests and/or input data from a user computer 905 and/or forward the web page requests and/or input data to an application server. In some cases a web server may be integrated with an application server.

In accordance with further embodiments, one or more servers 915 can function as a file server and/or can include one or more of the files (e.g., application code, data files, etc.) necessary to implement various disclosed methods, incorporated by an application running on a user computer 905 and/or another server 915. Alternatively, as those skilled in the art will appreciate, a file server can include all necessary files, allowing such an application to be invoked remotely by a user computer 905 and/or server 915.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 920. The location of the database(s) 920 is discretionary: merely by way of example, a database 920a might reside on a storage medium local to (and/or resident in) a server 915a (and/or a user computer 905). Alternatively, a database 920b can be remote from any or all of the computers 905, 915, so long as it can be in communication (e.g., via the network 910) with one or more of these. In a particular set of embodiments, a database 920 can reside in a storage-area network ("SAN") familiar to those skilled in the art. (Likewise, any necessary files for performing the functions attributed to the computers 905, 915 can be stored locally on the respective computer and/or remotely, as appropriate.) In one set of embodiments, the database 935 can be a relational database, such as an Oracle database, that is adapted to store, update, and retrieve data in response to SQL-formatted commands. The database might be controlled and/or maintained by a database server, as described above, for example.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method of collecting performance data about a database environment comprising one or more collection targets, the method comprising:

maintaining, at a collection server, a plurality of data collection policies, each data collection policy pertaining to a different one of a plurality of data servers, each data server comprising a database environment, each data collection policy comprising a set of information specifying which performance data is to be collected from the data server to which the data collection policy pertains, a set of information identifying a connection technique between the collection server and each collection target, and one or more data collection scripts for collecting the specified performance data, each data collection script comprising one or more Structured Query Language (SQL) scripts;

receiving, by the collection server, a data collection request identifying at least one of the data servers as a collection target for the data collection request;

identifying, by the collection server, the data collection policy for the at least one data server identified as the collection target by the data collection request;

initiating, by the collection server, communication with the data server identified as the collection target;

transmitting, by the collection server, the one or more data collection scripts stored in the identified data collection policy to the data server identified as the collection target;

receiving, at the collection server, a set of performance data about the database environment of the data server identified as the collection target, the set of performance data being generated by execution of the one or more data collection scripts by the database environment on the data server identified as the collection target, wherein the data server analyzes, before execution, the one or more data collection scripts according to a security policy of the data server to determine that the one or more data collection scripts include no commands that compromise the security of the data server; and storing, by the collection server, at least a portion of the set of performance data.

2. The method of claim 1, wherein initiating communication with the data server identified as the collection target comprises:

establishing communication between the collection server and an intermediary server; and establishing communication between the intermediary server and the data server identified as the collection target.

3. The method of claim 2, wherein the communication between the intermediary server and the data server identified as the collection target is a secure shell ("SSH") communication, the method further comprising, caching, at the intermediary server, login credentials for the data server identified as the collection target, such that the collection server does not have direct access to the data server identified as the collection target.

4. The method of claim 3, wherein the data collection policy comprises an identification of the intermediary server and an identification of a set of authentication credentials for authenticating the collection server at the intermediary server.

5. The method of claim 2, wherein the data server identified as the collection target is a first data server identified as the collection target, and wherein the intermediary server is a second data server identified as the collection target.

6. The method of claim 2, wherein the intermediary server comprises an edge server controlling access to the plurality of data servers and wherein the intermediary server performs, before the set of performance data is received at the collection server, at least a portion of a performance analysis of the set of performance data.

7. A system comprising:

a processor; and a memory coupled with and readable by the processor and storing a set of instructions which, when executed by the processor, causes the processor to implement a collection server for collecting performance data about a database environment comprising one or more collection targets by:

maintaining, at a collection server, a plurality of data collection policies, each data collection policy pertaining to a different one of a plurality of data servers, each data server comprising a database environment, each data collection policy comprising a set of information specifying which performance data is to be collected from the data server to which the data collection policy pertains, a set of information identifying a connection technique between the collection server and each collection target, and one or more data collection scripts for collecting the specified performance data, each data collection script comprising one or more Structured Query Language (SQL) scripts;

receiving, by the collection server, a data collection request identifying at least one of the data servers as a collection target for the data collection request;

identifying, by the collection server, the data collection policy for the at least one data server identified as the collection target by the data collection request;

initiating, by the collection server, communication with the data server identified as the collection target;

transmitting, by the collection server, the one or more data collection scripts stored in the identified data collection policy to the data server identified as the collection target;

receiving, at the collection server, a set of performance data about the database environment of the data server identified as the collection target, the set of performance data being generated by execution of the one or more data collection scripts by the database environment on the data server identified as the collection target, wherein the data server analyzes, before execution, the one or more data collection scripts according to a security policy of the data server to determine that the one or more data collection scripts include no commands that compromise the security of the data server; and storing, by the collection server, at least a portion of the set of performance data.

8. The system of claim 7, wherein initiating communication with the data server identified as the collection target comprises:
establishing communication between the collection server and an intermediary server; and
establishing communication between the intermediary server and the data server identified as the collection target.

9. The system of claim 8, wherein the communication between the intermediary server and the data server identified as the collection target is a secure shell ("SSH") communication, and wherein the set of instructions, when executed by the processor, further causes the processor to implement the collection server for collecting the pefomance data about the database environment comprising one or more collection targets by: caching, at the intermediary server, login credentials for the data server identified as the collection target, such that the collection server does not have direct access to the data server identified as the collection target.

10. The system of claim 9, wherein the data collection policy comprises an identification of the intermediary server and an identification of a set of authentication credentials for authenticating the collection server at the intermediary server.

11. The system of claim 8, wherein the data server identified as the collection target is a first data server identified as the collection target, and wherein the intermediary server is a second data server identified as the collection target.

12. The system of claim 8, wherein the intermediary server comprises an edge server controlling access to the plurality of data servers and wherein the intermediary server performs, before the set of performance data is received at the collection server, at least a portion of a performance analysis of the set of performance data.

13. A non-transitory computer-readable memory comprising a set of instructions stored therein which, when executed by a processor, causes the processor to implement a collection server for collecting performance data about a database environment comprising one or more collection targets by:
maintaining, at a collection server, a plurality of data collection policies, each data collection policy pertaining to a different one of a plurality of data servers, each data server comprising a database environment, each data collection policy comprising a set of information specifying which performance data is to be collected from the data server to which the data collection policy pertains, a set of information identifying a connection technique between the collection server and each collection target, and one or more data collection scripts for collecting the specified performance data, each data collection script comprising one or more Structured Query Language (SQL) scripts;

receiving, by the collection server, a data collection request identifying at least one of the data servers as a collection target for the data collection request;

identifying, by the collection server, the data collection policy for the at least one data server identified as the collection target by the data collection request;

initiating, by the collection server, communication with the data server identified as the collection target;

transmitting, by the collection server, the one or more data collection scripts stored in the identified data collection policy to the data server identified as the collection target;

receiving, at the collection server, a set of performance data about the database environment of the data server identified as the collection target, the set of performance data being generated by execution of the one or more data collection scripts by the database environment on the data server identified as the collection target, wherein the data server analyzes, before execution, the one or more data collection scripts according to a security policy of the data server to determine that the one or more data collection scripts include no commands that compromise the security of the data server; and storing, by the collection server, at least a portion of the set of performance data.

14. The non-transitory computer-readable memory of claim 13, wherein initiating communication with the data server identified as the collection target comprises:
establishing communication between the collection server and an intermediary server; and
establishing communication between the intermediary server and the data server identified as the collection target.

15. The non-transitory computer-readable memory of claim 14, wherein the communication between the intermediary server and the data server identified as the collection target is a secure shell ("SSH") communication, and wherein the set of instructions, when executed by the processor, further causes the processor to implement the collection server for collecting the performance data about the database environment comprising one or more collection targets by: caching, at the intermediary server, login credentials for the data server identified as the collection target, such that the collection server does not have direct access to the data server identified as the collection target.

16. The non-transitory computer-readable memory of claim 15, wherein the data collection policy comprises an identification of the intermediary server and an identification of a set of authentication credentials for authenticating the collection server at the intermediary server.

17. The non-transitory computer-readable memory of claim 14, wherein the data server identified as the collection target is a first collection target, and wherein the intermediary server is a second data server identified as the collection target.

18. The non-transitory computer-readable memory of claim 14, wherein the intermediary server comprises an edge server controlling access to the plurality of data servers and wherein the intermediary server performs, before the set of performance data is received at the collection server, at least a portion of a performance analysis of the set of performance data.

* * * * *

UNITED STATES PATENT AND TRADEMARK OFFICE
CERTIFICATE OF CORRECTION

PATENT NO. : 9,514,024 B2
APPLICATION NO. : 12/893167
DATED : December 6, 2016
INVENTOR(S) : Kumar It is certified that error appears in the above-identified patent and that said Letters Patent is hereby corrected as shown below:

On the Title Page

Column 2, under Other Publications, Line 1, delete "Aministrator" and insert -- Administrator --, therefor.

In the Specification

In Column 5, Line 45, after "embodiments" insert -- . --.

In Column 17, Line 35, delete "and or" and insert -- and/or --, therefor.

In the Claims

In Column 23, Lines 32-33, in Claim 9, delete "perfomance" and insert -- performance --, therefor.

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*